US011204980B2

(12) United States Patent
Marshall

(10) Patent No.: US 11,204,980 B2
(45) Date of Patent: Dec. 21, 2021

(54) SYSTEM AND METHOD FOR SECURELY RETRIEVING AND PLAYING DIGITAL MEDIA USING PEER-TO-PEER DISTRIBUTION

(71) Applicant: Marvin Marshall, Hideaway, TX (US)

(72) Inventor: Marvin Marshall, Hideaway, TX (US)

(73) Assignee: White Hot Visions, LLC, Hideaway, TX (US)

( * ) Notice: Subject to any disclaimer, the term of this patent is extended or adjusted under 35 U.S.C. 154(b) by 166 days.

(21) Appl. No.: 16/589,865

(22) Filed: Oct. 1, 2019

(65) Prior Publication Data

US 2020/0042674 A1 Feb. 6, 2020

Related U.S. Application Data

(63) Continuation-in-part of application No. 15/132,458, filed on Apr. 19, 2016, now Pat. No. 10,078,737, which is a continuation of application No. 14/219,088, filed on Mar. 19, 2014, now Pat. No. 9,576,114, which is a continuation of application No. 13/412,035, filed on Mar. 5, 2012, now Pat. No. 8,719,946.

(51) Int. Cl.
| | |
|---|---|
| *G06F 21/62* | (2013.01) |
| *G06F 21/10* | (2013.01) |
| *H04L 29/08* | (2006.01) |
| *H04L 29/06* | (2006.01) |
| *G06F 21/12* | (2013.01) |

(52) U.S. Cl.
CPC ............ *G06F 21/105* (2013.01); *G06F 21/10* (2013.01); *G06F 21/121* (2013.01); *G06F 21/6209* (2013.01); *H04L 63/10* (2013.01); *H04L 65/602* (2013.01); *H04L 67/10* (2013.01); *H04L 67/42* (2013.01); *G06F 2221/0768* (2013.01); *G06F 2221/0771* (2013.01)

(58) Field of Classification Search
CPC .. G06F 21/105; G06F 21/121; G06F 21/6209; G06F 21/10; G06F 2221/0771; G06F 2221/0768; H04L 67/10; H04L 67/42; H04L 63/10; H04L 65/602
See application file for complete search history.

(56) References Cited

U.S. PATENT DOCUMENTS

| | | | |
|---|---|---|---|
| 7,385,131 B2 | 6/2008 | Clift | |
| 8,719,946 B2 * | 5/2014 | Marshall | ................. G06F 21/10 |
| | | | 726/26 |
| 9,576,114 B2 * | 2/2017 | Marshall | ............... G06F 21/121 |
| 10,078,737 B2 * | 9/2018 | Marshall | ................. H04L 63/10 |

(Continued)

*Primary Examiner* — Matthew T Henning
(74) *Attorney, Agent, or Firm* — Michael P. Mazza; Michael P. Mazza, LLC

(57) ABSTRACT

A system and method for securely streaming/downloading and playing coherent digital content such as music and preventing its play by unauthorized users, facilitating a peer-to-peer sharing of cloned content. The system may include mass server/storage devices for receiving and storing digital content having predetermined gaps, and client devices communicating with the server/storage devices and providing authorization to proceed. During playing of the digital content by the client devices, the removed components may be reinserted into the missing gaps at the appropriate places, to allow the play or cloning of the coherent digital content.

14 Claims, 4 Drawing Sheets

(56) References Cited

U.S. PATENT DOCUMENTS

| | | | |
|---|---|---|---|
| 2002/0076048 A1 | 6/2002 | Hars | |
| 2002/0144153 A1 | 10/2002 | Levine | |
| 2002/0152874 A1* | 10/2002 | Vilcauskas | G06Q 30/06 |
| | | | 84/600 |
| 2005/0097006 A1* | 5/2005 | Nyako | G06Q 30/06 |
| | | | 705/26.44 |
| 2005/0119976 A1* | 6/2005 | Taylor | G06Q 30/06 |
| | | | 705/52 |
| 2006/0195909 A1* | 8/2006 | Boswell | H04N 5/913 |
| | | | 726/26 |
| 2008/0175190 A1* | 7/2008 | Lee | H04L 65/4069 |
| | | | 370/328 |
| 2010/0135637 A1* | 6/2010 | McDermott | H04N 5/76 |
| | | | 386/344 |
| 2010/0175537 A1* | 7/2010 | Ikeya | G09B 15/08 |
| | | | 84/478 |
| 2012/0109784 A1 | 5/2012 | Marion | |
| 2012/0117659 A1 | 5/2012 | Gearhart | |
| 2012/0207306 A1* | 8/2012 | Candelore | H04L 67/06 |
| | | | 380/287 |
| 2013/0232581 A1* | 9/2013 | Marshall | G06F 21/10 |
| | | | 726/28 |
| 2013/0244624 A1* | 9/2013 | Das | H04W 4/33 |
| | | | 455/414.1 |
| 2016/0171186 A1* | 6/2016 | Marking | H04L 63/126 |
| | | | 713/190 |

* cited by examiner

SYSTEM AND METHOD FOR SECURELY RETRIEVING AND PLAYING DIGITAL MEDIA USING PEER-TO-PEER DISTRIBUTION

This application is a continuation-in-part of Ser. No. 15/132,458, now U.S. Pat. No. 10,078,737, which is a continuation of U.S. Ser. No. 14/219,088, now U.S. Pat. No. 9,576,114, which is a continuation of U.S. Ser. No. 13/412,035, filed Mar. 5, 2012, now U.S. Pat. No. 8,719,946.

BACKGROUND OF THE INVENTION

The present invention generally relates to a virtual "digital music box or media box," i.e., an apparatus and method for retrieving and playing songs. More specifically, the invention is directed to such an apparatus and method that permits downloading/streaming via the Internet only the missing segments of songs or media to be selectively added to matching song or media previously provided in a physical media, for example.

The sale and distribution of music in many varying forms (e.g., by playing the music on records, 8-track tapes, Sony Walkmans and Apple i-Pods) and mediums (e.g., radio, television, phone, computer) is a huge business. Music, movie, book lovers, etc. have long sought ever more expedient and economical ways to enjoy digital content. Unfortunately, this has often led to unauthorized copying of these copyrighted digital products, which if left unchecked disincentivizes authors and owners from involving themselves in the creative development for the digital industry.

A huge and growing way that listeners enjoy music is to stream the music over the Internet and onto a medium that can play the music, such as a phone, i-Pod, computer, etc. Many patents and commercially available devices have sought to prevent the unauthorized copying of music streamed over the Internet or other mediums in different ways. Some have disclosed providing the music with a digital "watermark" which can be verified, such as U.S. Pat. No. 7,194,617 to Weimerskirch. This method would require relatively expensive and time-consuming instruments and/or software for checking for the digital watermarks in order to prevent unauthorized copying. Others have sought to inhibit the illicit stitching together of downloads by adding disruptions such as silence gaps, as disclosed in U.S. Patent Publication No. 2002/0076048 to Hars. The problem with Hars, or other similar attempts to stop or discourage piracy, is that the entire digital content is in the hands of the consumer and/or pirate experts. Pirate experts in this field can identify watermark or similar identifiers and defeat them. Alternatively, at a minimum, pirate experts can create a codec that will make it playable even with the watermark left intact. In short, if the complete digital content is allowed to be in the possession of the consumer, it will be compromised.

Accordingly, it would be highly advantageous to provide an expedient and economical way for listeners to enjoy digital content in a manner that delivers the highest of quality, is not limited by bandwidth, and protects the industry, while at the same time reducing the present clogging of the Internet and preventing unauthorized copying of the digital content in a fast, reliable and cost-efficient manner. It would also be advantageous to provide this without requiring new or additional player hardware technology (e.g., a description chip) in order to function and safeguard the digital industry. (See http://en.wikipedia.org/wiki/Secure_Digital_Music_Initiative (explaining the failure of SDMI, the Secure Digital Music Initiative).

Definition of Claim Terms

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Coherent" or "whole" media means the entire digital content, whether it is musical content such as song or other digital content such as films, text, images, etc. When "coherent" or "whole" media is played, both the RMC and the EMC (i.e., any removed components, including temporally placed foreign parts filled or replaced into the digital content in its appropriate order) is played. Upon extracting segments from the original "coherent" or "whole" media, (e.g.) two or more bodies of digital media remain, and they are incoherent until rejoined when played. The portion(s) which are removed are referred to here as Extracted Media Components (EMC). The remaining body with the missing or inserted foreign parts is referred to as the Remaining Segmented Media Content (RSMC or "RMC" for short). The word "gaps" can mean either missing or inserted foreign parts.

"Extracted Media Components" (EMC) means the digital media content portion(s) which is/are removed from the original coherent or whole digital media content.

"Fulfillment server" means the server(s) which has the coherent or whole digital media content stored on, or readily accessible by, the server(s), as well as the algorithms for providing the EMC and RMC.

"Incoherent" means incomplete digital content, with removed components forming missing gaps in the content.

"Remaining Segmented Media Content" (RMC) means the digital media content which remains, after components (EMC) have been removed or foreign material has been inserted.

"Attribution linkage" means a record that creates a relationship between either a cloner and a cloned EMC/RMC, or a cloner and a recloned EMC/RMC. (Multiple cloners can serially reclone a EMC/RMC, creating generations of recloned EMC/RMCs. Attribution linkages enables a streaming provider to trace cloning attribution all the way back to the original cloner. Retaining attribution linkage creates a way for a streaming provider to create an incentive structure for peer-to-peer distribution of RMCs akin to referral marketing.)

"Cloned EMC/RMC" means an EMC/RMC uniquely generated by a streaming provider at the request of customer/user (the cloner). The streaming provider creates attribution linkage between the Cloned EMC/RMC and the cloner such that the streaming provider can attribute the cloner when any other user subsequently uses the Cloned EMC/RMC to play a song.

"Cloned song" is a synonym for cloned EMC/RMC.

"Cloner" means customer/user who either causes the streaming provider to clone an EMC/RMC, or to reclone a cloned EMC/RMC.

"Cloner zero" or "original cloner" means the customer/user who initially causes a cloned EMC/RMC to be generated from a standard EMC/RMC served up by the streaming provider. (Multiple customers/users may choose to clone the same EMC/RMC, or upgrade their account to become a cloner and generate new EMC/RMC to be cloned if desired.)

"SSP player" means an application installed on a customer's/user's device (e.g., smartphone, laptop, desktop, etc.) by a streaming service provider, and capable of playing back protected content. The SSP player can also be an appliance akin to a Sirius XM radio, where the SSP player is part of a manufactured device or simply a software app.

"SSP" or "SSP Cloud" means an Internet-based streaming service that uses the claimed invention to protect its streamed content from being pirated. The SSP Cloud is a data center/website that streams content protected by the technology described in the patents to customers. The claimed invention can protect any kind of digital file (including songs, movies, games, instructions for directing a 3D printer to manufacture a gizmo, and so on.) The MDS Cloud can also conduct a number of operations in addition to streaming content to users, such as obtaining payment prior to streaming content to users (unless the owner wants to provide the content for free and generate revenues through advertising). (Together the SSP player and the SSP Cloud preferably work together to form a seamless system that protects content by containing it such that it is not exposed to external clients as a digital file.)

"Recloned EMC/RMC" means cloned EMC/RMC generated during or after the cloner listens to a cloned song. The recloned EMC/RMC has an additional attribution linkage to the previous cloned song.

SUMMARY OF THE INVENTION

The objects mentioned above, as well as other objects, are solved by the present invention, which overcomes disadvantages of prior devices and methods for retrieving digital media content such as music over the Internet and playing it while preventing unauthorized copying, while providing new advantages not previously obtainable with such devices and methods.

In a preferred embodiment, a method for peer-to-peer distribution is provided, enabling customers of a system to securely download/stream and play coherent digital content and to prevent its play by unauthorized users. The coherent digital content (such as a playable song or other media content) includes segmented media content with predetermined gaps corresponding to fragmented media content. The method includes the step of the first customer computer requesting the system to create a clone of specified coherent digital content. Upon receiving this request, the system generates, from the specified coherent digital content, segmented media content, fragmented media content and a reassembly algorithm, corresponding to the specified coherent digital content. The segmented media content is then provided to the first customer computer, and the segmented and fragmented media content are merged into the coherent digital content during the time of play by the first customer computer. The fragmented media content and the specified coherent digital content may be erased at the first customer computer preferably during or immediately after the play. The first customer computer may then share the segmented media content corresponding to the specified coherent digital content with a second or additional customer computers, allowing the second or additional customer computers to access the fragmented media content and the reassembly algorithm corresponding to the specified coherent digital content, and then to play the coherent digital content with the same protection of erasing the EMC portion during play.

Preferably, the second or additional customer computers access the fragmented media content and the reassembly algorithm corresponding to the specified coherent digital content, through the SSP Cloud. The fragmented media content may be encrypted prior to transmitting it to the first customer computer. Verification information, such as a user name and/or email address or other information, may be required to be input from a customer computer before the customer computer is permitted to play or clone protected content.

In a particularly preferred embodiment, the first customer computer may be permitted by the system to share the segmented media content with the second or additional customer computers using a peer-to-peer distribution system such as DropBox, Media Fire, etc. In one preferred embodiment, the cloning step creates an attribution linkage from the cloner to the cloned EMC/RMC, enabling the system to determine which cloner generated the cloned RMC used by other system users. The attribution linkage can be used to create an incentive to encourage greater peer-to-peer sharing of cloned content. Such an incentive can be, for examples, prizes awarded to one or more cloners for reaching milestones of numbers of newly added users or recloners.

Preferably, an SSP player associated with a customer computer can be employed to automatically cache the RMC to local persistent storage, thereby reducing the system bandwidth used when re-playing previously streamed digital content. A customer computer may provide one or more copies of cached RMC to other system users.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Figure 1:
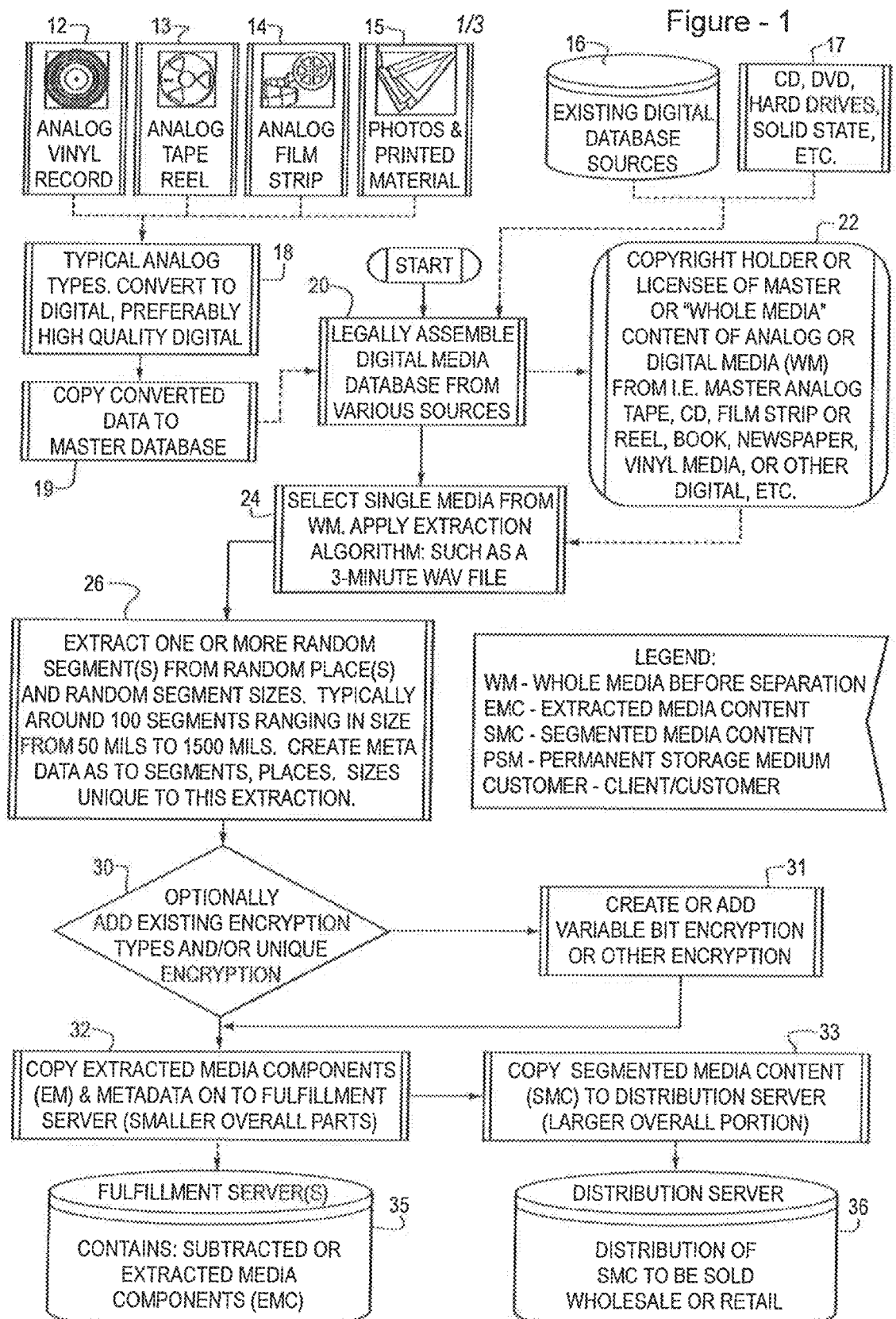
FIG. 1 is a flowchart showing an exemplary embodiment in which digital media content such as music may, according to a preferred embodiment of the present invention, be downloaded/streamed and distributed, via a distribution system, to customers.
Figure 2:
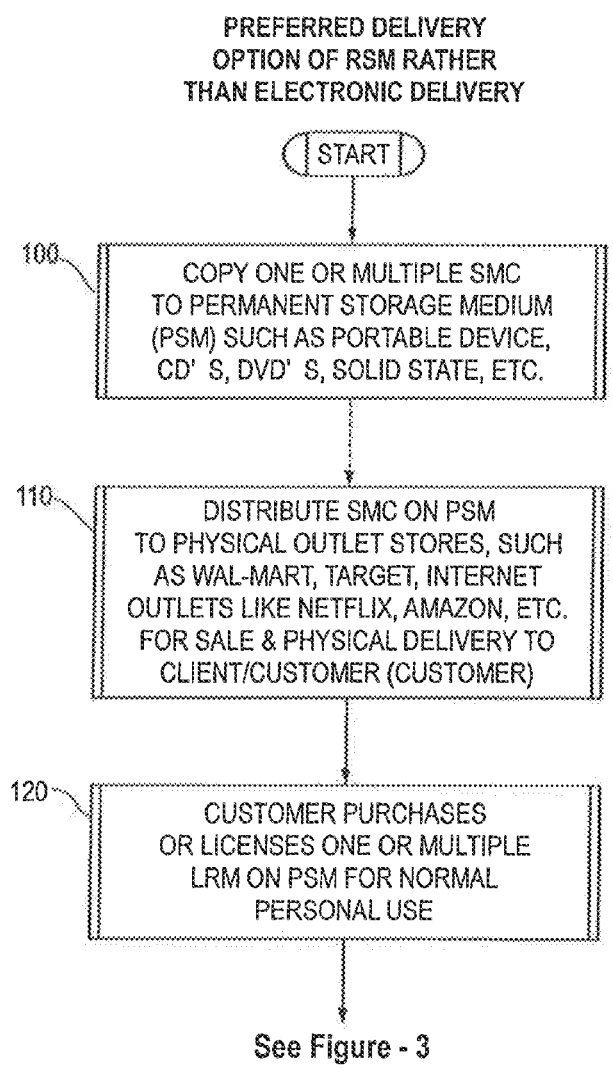
FIG. 2 is a flowchart showing a preferred delivery mechanism.

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

In one preferred embodiment of the present invention, if a song or other digital media content has been licensed from an owner of the "virtual music box" ("VMB," also referred to as a "player" here), for example, the VMB could store portions of the licensed digital media content, which could include removed components forming missing gap portions.

(Preferably, the removed components constitute a sufficiently large portion of the digital media content so as to make their omission from the played content sufficiently noticeable, to discourage unauthorized copying.) These removed components may be stored on a "fulfillment" server(s) and streamed or downloaded in real-time so that when an individual request occurs for specific media content (e.g., to listen to a particular song), the portion of the song being played becomes "coherent" (i.e., the entire digital content of the song is played, without interruptions or gaps); at the same time, for security and to protect the licensed nature of the digital content, the individual streaming or downloading the song is not able to save or store the entire coherent digital content. As a condition precedent to playing the coherent song with the removed components, a licensing authorization step would take place. A detailed description of how preferred examples of the invention may be commercially practiced is provided below.

Additionally, the EMC's components could be streamed or downloaded in a different, possibly random, sequence with respect to the order in which they were extracted from the RMC. In this case, the components would just be placed out of sequence in the EMC. As before, the player could simply cache the buffered components in non-persistent memory while/until the components are used to fill the gaps in the RMC, played to the listener, and then destroyed or erased during play or afterward. (The SSP player can be automatically downloaded to a user computer from the SSP Cloud.)

In the preferred embodiment, a pseudo-random number generator can be used to create the parameters given for each gap variable (e.g., length, number, location, sequence) used to remove the components (which will become parts of the EMC) from the master recording (creating a version of the master recording containing the gaps, which will become the RMC) while at the same time creating the algorithm (which will become part of the EMC) to control the reinsertion of the removed components back into the RMC's gaps during playback. The variety of unpredictable parameters produced by the pseudo-random number generator would make deciphering the missing gaps exceedingly difficult, as there is essentially a unique "key" in order to "unlock" the algorithm to provide each coherent song. To provide an even higher level of security, the gaps could, alternatively, instead of silence, consist of a series of pops, clicks, whistles, etc., that would be exceedingly difficult to be removed using any known software. (As an example, in place of all the pieces removed, blank audio could be inserted, so that the total file sizes of the original and the unique split are the same.

A still further possibility is that the removed components from one song could be deployed together with the removed components from other songs on the VMB. In other words, every song on the VMB could have its removed components stored within other songs in their respective gaps.

To make the system even more secure, the removed components for songs stored on the VMB could be stored on various servers, and a combination of two or more servers could be required to be connected in order to play any one song.

Preferably, to avoid any danger of unauthorized copying, the coherent song should not be stored on the VMB. Instead, if a song is replayed, the download and checking process may again be repeated.

In another embodiment of the invention, and as an additional security feature, the VMB could have associated with it one or more speakers that play, for example, the mid-range sounds of songs, while other spectrums of the sound range could be played through external speakers not associated with the VMB. This would require an unauthorized copier/hacker, in order to purloin the coherent song, to break into the VMB. But once the detectable seal is broken (per the description below), the entire system would not play. Therefore, the hacker could steal the stored media in the VMB, but this would be worthless without access to the fulfillment server(s).

In another embodiment of the invention, the SSP player automatically caches the RMC to local persistent storage. Caching the RMC saves approximately 90% of bandwidth when re-playing previously streamed protected content. Afterward the MDS user can give copies of a cached RMC to other MDS users. To make the MDS system even more user-friendly, real-time slider bar controls can be provided to user computers (downloaded with the player), enabling consumers to quickly find their music sweet-spot fast and in an easily-controlled fashion.

The SSP player can have a predetermined limit (a quota) on the maximum local storage consumed by cached RMCs. The SSP player would enforce this quota by automatically deleting RMCs selected by a deletion algorithm. One possible deletion algorithm would be to delete the least recently played RMC when the local storage consumed by cached RMCs exhausts this quota.

The SSP player may also include a "save" button to protect SSP user-specified RMCs from deletion from local storage by the deletion algorithm. As an example of using the save button, the user can specify a particular RMC, say, of a favorite song, to not be automatically deleted by the deletion algorithm by selecting the song and clicking the save button. By saving a movie, song, etc., the replay of any of these saved contents allows overall streaming bandwidth of the content to be cut by, e.g., 90%, which provides multiple benefits to all participating in the system hierarchy.

The present invention has other applications besides audio. For example, its principles could be used to solve bandwidth limitation issues, and many other problems and limitations associated with the streaming or download of data in office/home locations, for example, as well as the security associated with new cloud limitations.

Referring now to FIG. 1, a preferred embodiment is described for distributing music to consumers according to one aspect of the invention. Master analog or digital media content (i.e., "whole" music) may be legally assembled from various sources at step 20, which sources may include: analog vinyl records 10, analog tape reels 12, analog film strips 13, photos and printed material 14, existing digital database sources 16 and CDs, DVDs, hard drives, solid state content, etc., 17. Analog content may be converted to digital content at step 18, and this digital content may be copied to a master database at step 19. The master database(s) of authorized digital media content compiled from various sources may be assembled at step 20 and the entire content or portions thereof may be transferred to any authorized holder at 22. An appropriate extraction algorithm may be used, and in step 26 the media content may be divided into RMC and EMC, such as by using randomly generated algorithms to do so. (As one example, about 100 segments ranging in size from 50-1500 milliseconds may be used; corresponding metadata may also be created to indicate the segment size and placement unique to the particular extraction, for example.) Sections of musical content of variable lengths (creating gaps of various lengths in what is to become the RMC) may now be removed from the music. The sections removed become the components that comprise the EMC. Optionally, instead of leaving the gaps in the RMC as silences or voids, some or all of the gaps could be replaced with an array of sounds (e.g., whistles, static, etc.). The metadata at step 26 could still function similarly when the rejoining (RMC+ECM) process is performed.

Still referring to FIG. 1, at optional steps 30/31, the ESM and/or RMC could be encrypted, such as by using existing encryption techniques, or by using variable bit or other unique encryption techniques. Now, in a preferred embodiment, at steps 32 and 33, the EMC (e.g., smaller overall portion) and corresponding meta data may be copied to fulfillment server(s) 35.

Still referring to FIG. 1, preferably multiple fulfillment servers 35 are used, as this would have several benefits, including redundancy, load balancing, etc. This can also serve as an extra layer of encryption by spreading parts of each EMC over separate fulfillment servers 35.

Figure 3:
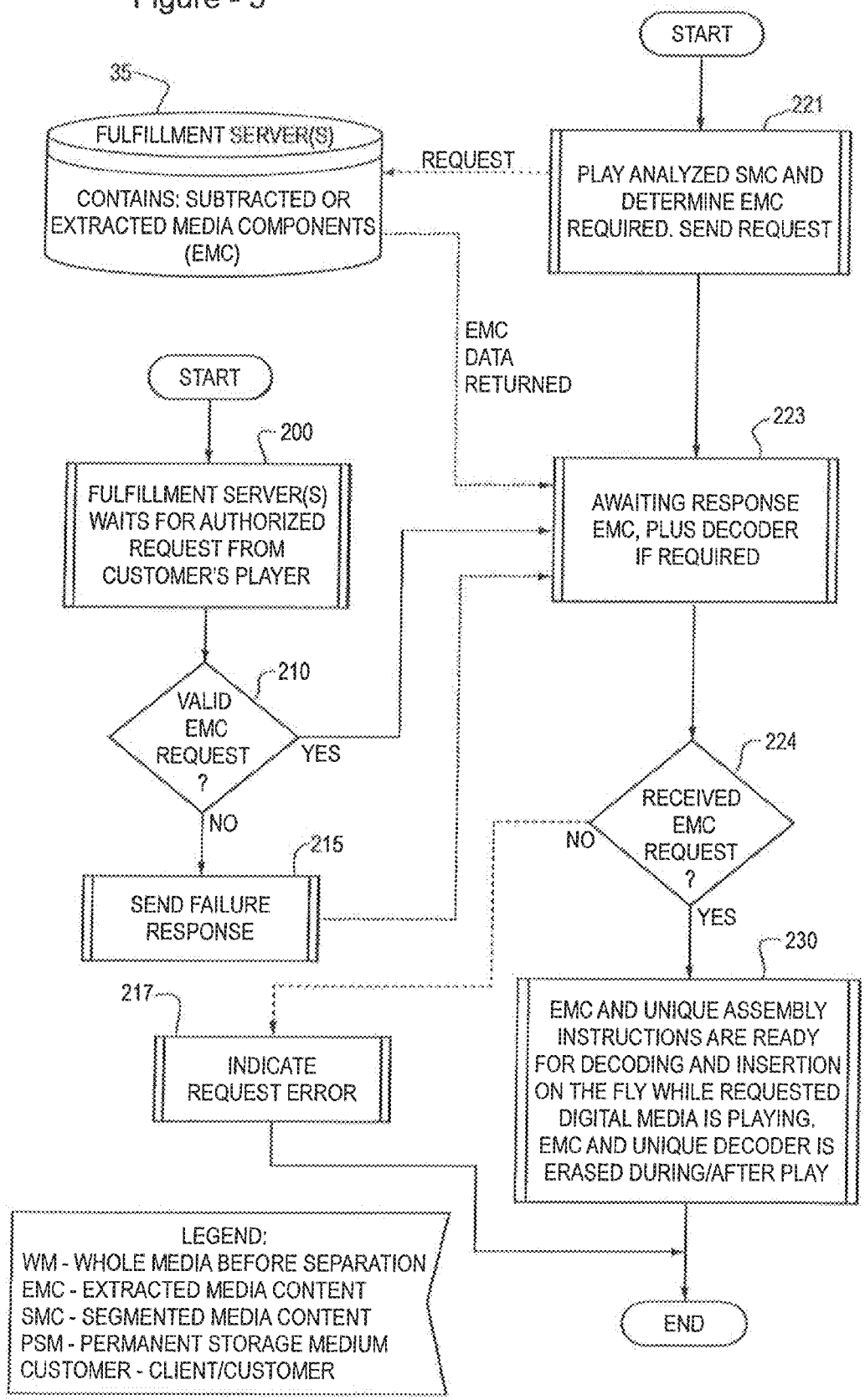
FIG. 3 is a flowchart showing the logical flow of delivery and play of digital content according to a preferred embodiment of the invention.

Referring now to FIG. 3, a licensed customer or client may now use his/her SSP player, an application installed on their computer or other digital device, to electronically access the fulfillment server(s) controller 205 and reassemble the removed components into their correct order, determining the exact point of insertion "on the fly" as the song or other content is playing, discarding (not saving) the removed components as they are played. The customer may, for example, supply a unique Customer ID which may be checked at step 210. The customer request may also include requests to the fulfillment server(s) controller 205 for one or more of the following: the (EMC) of particular digital content, such as a particular song; the parameters of a particular audio file corresponding to the requested song; the list of songs a particular client can play; and the song list details (e.g., the number of songs, the hash of the song list to check against, etc.). To check the validity of the customer/client request, fulfillment server(s) controller 205 may send the request at step 210. If the request is denied, a message may transmit the denial at step 215, and the reason for denial may be provided to the customer/client at 223. If the client ID is authorized, the request may be authorized at step 220, releasing the fulfillment server(s) 35 to retrieve the appropriate EMC for the ID number for that song or other digital content that is about to commence playing and forward them, along with the corresponding decryption decoder information, if any, to the client computer or other digital device at step 223.

If the response is denied at step 217, the reason for the denial (e.g., lack of funds, failure to authenticate customer ID, etc.) is transmitted to the customer's player, and the customer may be given an opportunity to overcome the denial (e.g., by paying the required funds, providing an authentic customer ID, etc.). Upon proper validation at step 224, metadata and the removed components to be reinserted into the RMC's gaps, along with instructions on how to do so and where, at step 230. Also at step 230, for security reasons, the EMC and unique decoder information will be erased on the client computer or other digital device during or immediately following play of the requested digital content. If the response is invalid, a notification of a request error is provided at step 217, and the process again ends.

Optionally, the initial request at step 205 may be permanently blocked, or blocked based on time-sensitive variables, for example, by blocking the player from proceeding if more than a predetermined number of invalid attempts are made. If the request is valid, play continues and gaps are returned temporarily to allow normal play for that request, as described above. In a preferred embodiment, the RMC may play coherently for (e.g.) 15 seconds (a recommended variable of the RMC is that it has no gaps at the beginning) so as to give the listener a very short sample of the content before playback is interrupted. The process may be repeated for any song or other digital media content that the customer/player has purchased/licensed and has been loaded into the customer's player.

As part of the process, royalty fees may also be calculated and deducted based on any applicable royalty or license agreement.

With previous of the instant inventor's patents, digital content has two distinct parts: Extracted Media Content (EMC) and Remaining Segmented Media Content (RMC or "RMC" for short). There, in one embodiment, the RMC was disclosed as being distributed to retailers on Permanent Storage Media (PSM) such as a thumb drive or other external attachable storage device. Also, the makeup of the overall EMC (songs, movies, etc.) could be predetermined by the owner/distributor of the digital content. With the present invention, and referring to FIG. 4, persons of ordinary skill in the art should understand that all cloned digital streamed content (including the "fragments" (EMC) and the "segments" (RMC) shown by the different, labeled streams) is unique from its un-cloned versions and all clones of a given digital streamed content, such as for a particular song, are unique from each other. In one embodiment, the actual splitting process is performed before, preferably milliseconds before, streaming EMC/RMC content to the end customer, and both EMC and RMC may be erased on the fly. (Downloading of the player can occur during the cloning process.)

It should also be understood that if two exact original recorded contents are streamed to multiple customers, each will have its own unique splitting content. For example, if 100 customers are streamed Don McClean's song American Pie, all 100 split streams will be unique (i.e., each split stream has its own digital network signature (DNS)" and therefore a unique algorithm related to each split stream is needed to reassemble it). A record may be kept on a designated server of each algorithm/DNS. Now, when a customer desires to save his/her song that is being streamed, he/she can elect to "save" the content to permanent memory on his/her device. Preferably, when this is done, only the Segmented portion (RMC) is saved to the customer's permanent storage, ready for replay or cloning, while the EMC is erased immediately for security reasons.

In order for the "cloning" (use of unique algorithm to reassemble digital content) to work, a unique "player" (such as open-source software, then modified, then preferably made executable, so that it cannot be read or examined) can be automatically downloaded from the SSP Cloud to each user.

Referring again to FIG. 4, the peer-to-peer distribution system of the preferred embodiment of the present invention is shown. Preferably, each new recipient has downloaded or received a unique player before original content or cloned content will play. For new content, both fragmented and segmented portions must be streamed. For cloned content, only the fragmented content (EMC) needs to be streamed. As an example, if the split of content is 10% fragmented/EMC and 90% segmented/RMC, then bandwidth is cut 90% on all cloned content.

Figure 4:
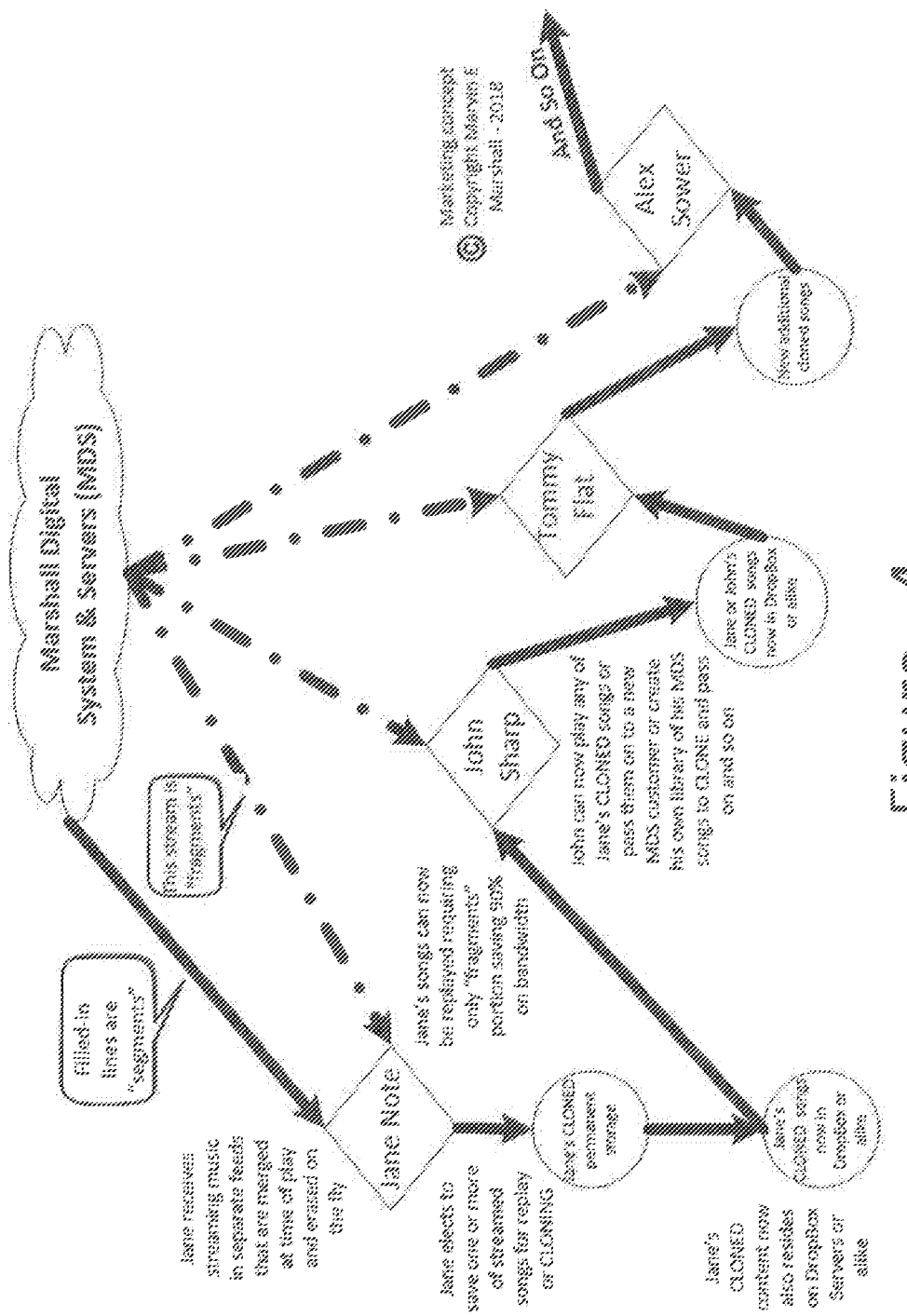
FIG. 4 is a schematic showing a preferred embodiment of the present invention.

As can be seen from FIG. 4, direct customers (through their computers) can perform a large part of the distribution, by creating new clients, either directly (by email and the like) or by using distribution centers such as DropBox, Media Fire, etc. Persons of ordinary skill in the art will appreciate that the "DNS" (i.e., the unique algorithm allowing reassembly of the fragmented data with the segmented data) is uniquely associated with the original recipient no matter how many times it is cloned, so that the DNS may be passed from clonee to cloner. For example, per FIG. 4, if "Jane" wants to be a cloner, she can request permission from the system to do this, and the segmented portion (permanently on Jane's hard drive) may be saved, while the fragmented portion is erased. To be a cloner, Jane might be required to agree to the system terms; for example, Jane might be required to provide the name and email address of the person(s) she wants to share the cloned data with. The clonees can gain permission to use the fragmented content (erased on Jane's computer), together with the "DNS" (reassembly algorithm passed from Jane), from the system by providing various information, such as verifying name and email address, paying for it, sharing library content and/or other requirements. To induce more customers to clone their own song library, incentives can be used, such as discount cards, or other perks or referral fees. (In one example, upon users providing a fee and verification information, the system downloads from the Cloud a player for the user computer's use. A "subscription" fee might be paid monthly or annually, or each time a song is streamed, for example; depending on whether advertising is included or not, the fee may vary. Permission to clone, with or without advertising, might involve different fees.

It should now be appreciated that using the scheme set forth in FIG. 4, a large, predominant or at least a substantial portion of the data bandwidth burden necessary to play the coherent digital content, such as streaming songs, can be relayed to the clonees, and not borne by the system.

In an alternative preferred embodiment of the present invention, a user (the cloner) can elicit, from the streaming provider, the generation of a new and unique EMC/RMC for a given song. This new and unique EMC/RMC is called a "cloned song." The cloned song is functionally equivalent to the EMC/RMC from which it was derived, but it has a unique signature because the original content was fragmented in a unique way when generating the cloned song. The cloning step also creates an attribution linkage from the cloner to the cloned EMC/RMC. The cloner can now share copies (via peer-to-peer distribution) of the cloned RMC with other users.

Users who receive this cloned RMC can listen to the cloned song on their SSP player. An attribution linkage created by the cloning process provides a way for the streaming provider, when streaming a cloned song to any user, to determine the cloner's identity.

Using this new step, a whole new marketing/distribution system can be derived. First, on the SSP player, which resides on the user's device, a "clone button" may be provided (or added depending upon the streaming provider's discretion). Upon being provided this feature, the user can elect to clone a song by selecting content and clicking the Clone Button provided on the SSP Player.

A user who selects a particular song and clicks the clone button becomes the "cloner" of the selected song. The SSP streaming provider may process the clone request by: (1) generating a new (cloned) EMC/RMC for the song, where (2) the cloned EMC/RMC has a unique signature (because it was fragmented in the song's content in a unique way); and (3) creating attribution linkage back to the cloner, resulting in a cloned song that is linked to its cloner.

Afterward, a cloner can also conduct peer-to-peer sharing of downloaded RMCs, but with the added advantage of receiving attribution for influencing another user to play content they have cloned. For example, a cloner who acts as an influencer on others could upload cloned RMC to the public Dropbox folder and afterward Tweet a download link of the cloned RMC to followers. Later, some of the followers could play the cloned song by using this download link to obtain the cloned RMC and play it on their SSP players. The cloned song's attribution link will enable the SSP streaming provider to give attribution to the cloner for every playback of a cloned song.

A user can also choose to create a clone of a cloned song (called "recloning" a song). The recloning step is similar to the initial cloning (e.g., a new EMC/RMC with a unique signature is created, and an attribution link to the cloner is created), except that an additional attribution link can be created back to the previous cloned song. In this way multiple cloners can serially re-clone EMC/RMC, creating generations of recloned EMC/RMCs. Attribution linkages enable the SSP streaming provider to trace cloning attribution all the way back to the initial cloner.

Attribution linkage allows cloning to be traced back to the original cloner or any subsequent user participating in the cloning process. This, in turn, opens up additional marketing options, such as providing rewards to Cloners, or the creation of "competition boards" listing top cloners and recloners. With users doing distribution and customer acquisitions, overall marketing cost should decrease proportionally; further with approximately 90% bandwidth usage being saved, overall distribution costs should drop proportionally also. Retaining attribution linkage creates a way for the streaming provider to create an incentive structure for peer-to-peer distribution of RMCs.

The streaming provider can use the attribution linkage to create incentives and contests to encourage maximum peer-to-peer sharing of cloned content. For example, a streaming provider might post rankings of cloners, and prizes may be awarded for the highest number of new users and the highest number of reclones. The cloning feature will not only be extremely attractive to present and potential users, but it also has system benefits, for at least the following reasons: (1) cloners can create new customers for the streaming provider, saving the streaming provider potentially large customer acquisition costs; (2) on all cloned content, the system will never have to stream the RMC; and (3) even though the random splitting of each song virtually stops piracy, the cloning feature effectively eliminates the desire (and market) to do so.

In an optional configuration, the MDS player automatically caches the RMC to local persistent storage. Caching the RMC can save, for example, approximately 90% of bandwidth when re-playing previously streamed protected content. Afterward, a system user can also conduct peer-to-peer sharing of downloaded RMCs, although without the advantage provided by the attribution linkage, which would have been created by the cloning process.

The SSP player can have a predetermined limit (a quota) on the maximum local storage consumed by cached RMCs. The SSP player could enforce this quota by automatically deleting RMCs selected by a deletion algorithm. One possible deletion algorithm would be to delete the least recently played RMC when the local storage consumed by cached RMCs exhausts this quota.

The SSP player may also provide a "save" button to protect user-specified RMCs from deletion from local storage by the deletion algorithm. As an example of using the save button, the user can specify a particular RMC for, e.g., a favorite song, to not be automatically deleted by the deletion algorithm by selecting the song and clicking the save button. Alternatively, the user can also clone the Permanently Saved content.

Persons of ordinary skill will glean various concepts from the above disclosure. For example, preferably, the RMC can be shared with anyone because it is secure and unplayable without a SSP player, including anonymous individuals and people who (because they don't have an account) are not yet users or do not yet have a SSP player installed on their computer. Further, the cloning step is preferably distinct from the sharing step. Put another way, cloning preferably produces a cloned EMC/RMC. Afterward, the cloner can choose to create copies of the cloned RMC and give them away to others.

It should also be understood that cloning is preferably conducted by the MDS cloud, not customer computers. The following is one example of a use case for cloning a song:

| Actor | Action |
|---|---|
| Cloner | Selects a song to be cloned |
| Cloner | Requests SSP cloud to clone a song |
| SSP cloud | Clones specified coherent digital content, creating a cloned EMC/RMC |
| SSP cloud | Downloads cloned RMC to cloner (most likely via the cloner's SSP player) |

At the end of this use case the clone possesses his own copy of the cloned RMC. The cloner can now make copies of the cloned RMC and give these copies to other people.

Here is another preferred example of a "use" case. Referring to FIG. 4, we posit that Jane plays "American Pie," with a unique EMC/RMC, while another customer "X" streams American Pie with a unique EMC/RMC different than Jane's EMC/RMC. When Jane clones her American Pie, by uploading to DropBox, or another peer-to-peer distribution service, the metadata attached to the song allows for the SSP Cloud to identify the correct EMC to stream to whomever receives Jane's RMC. Even if Jane's RMC is cloned and recloned hundreds of time, the threat that would-be hackers would undertake the monumental effort to replace the missing gaps is very unlikely when it is so easy to obtain the song straight from the SSP cloud simply by being a free customer, for example.

| Actor | Action |
|---|---|
| Cloner | Selects song from his/her MDS saved playlist (RMC) |
| (Optional) Cloner | Provide Cloud with name and email address of recipient |
| Cloner | Uploads song RMC to DropBox or alike |
| Recipient | Downloads cloned (RMC) from DropBox or alike |
| Recipient | Plays cloned song |
| MDS Cloud | Streams EMC to recipient while song is playing and erases EMC on-the-fly |

It should be noted that all clones of a particular, e.g., song, each have a unique signature and all clones of the same song can be distinguished from each other by their unique signatures.

One efficient way to compute a signature is by conducting an MD5 hash on, say, the EMC. An MD5 hash will generate a 128-bit value (e.g., d54b7ba27571a2f00b38ed9273b974f2) for a file. This value can be considered the file's signature. Modifying a single bit in the file will result in a different signature.

It will now be appreciated that by consumers cloning their content to new consumers, they are saving the providers of content huge bandwidth costs, but also greatly reducing customer acquisition costs. Given these savings, even studio quality sound is now viable to this ever-growing segment of the market. Also, with all these basic savings for the providers, providers can elect to give zero-base cloners gift cards or other awards, for example.

The above description is not intended to limit the meaning of the words used in the following claims that define the invention. For example, while preferred embodiments have been described above, persons of ordinary skill in the art will understand that a variety of other designs still falling within the scope of the following claims may be envisioned and used. It is contemplated that future modifications in structure, function or result will exist that are not substantial changes and that all such insubstantial changes in what is claimed are intended to be covered by the claims.

I claim:

1. A peer-to-peer distribution method for enabling customer computers of a system including one or more streaming service providers to securely stream and play coherent digital content and to prevent its play by unauthorized users, the coherent digital content comprising remainder media content ("RMC") with predetermined gaps corresponding to fragmented media content ("EMC"), comprising the steps of:
a first customer computer requesting creation of a clone of specified coherent digital content;
upon receiving the request, the system generating, from the specified coherent digital content, cloned RMC and EMC and a reassembly algorithm enabling reassembly of the cloned RMC and EMC into the specified coherent digital content;
streaming the cloned RMC and the EMC to the first customer computer;
buffering the RMC and EMC in non-persistent memory associated with the first customer computer;
reassembling the RMC and EMC into coherent digital content when playing the coherent digital content by the first customer computer;
erasing the buffered EMC from the non-persistent memory associated with the first customer computer during or immediately after the playing of the coherent digital content by the first customer computer;
sharing the RMC corresponding to the specified coherent digital content with a second or additional customer computers;
the second or additional customer computers accessing the EMC and the reassembly algorithm corresponding to the specified coherent digital content, and buffering the EMC in non-persistent memory associated with the second or additional customer computers;
whereby the second or additional customer computers are enabled to play the coherent digital content, and wherein the buffered EMC from the non-persistent memory associated with the second or additional customer computers is erased during or immediately after the playing of the coherent digital content by the second or additional customer computers.

2. The method of claim 1, wherein the second or additional customer computers access the EMC and the reassembly algorithm corresponding to the specified coherent digital content, using a streaming service provider.

3. The method of claim 1, further comprising a step of encrypting the EMC prior to transmitting it to the first customer computer.

4. The method of claim 1, wherein verification information is required from a customer computer before the customer computer is permitted to clone protected content.

5. The method of claim 4, wherein the verification information comprises a user name and email address.

6. The method of claim 1, wherein the first customer computer shares the RMC with the second or additional customer computers using a peer-to-peer distribution system.

7. The method of claim 1, wherein during the step of the system generating the cloned RMC and EMC, the system creates an attribution linkage from the first customer computer to the cloned RMC and EMC, enabling the system to determine which customer computer generated cloned content used by other system users.

8. The method of claim 7, further comprising a step of using the attribution linkage to create an incentive to encourage greater peer-to-peer sharing of cloned content.

9. The method of claim 8, wherein the incentive comprises one or more prizes awarded to one or more cloners for reaching milestones of numbers of newly added users or recloners.

10. The method of claim 1 wherein a streaming service provider player associated with a customer computer automatically caches the RMC associated with that customer computer to local persistent storage, thereby reducing the system bandwidth used when re-playing previously streamed digital content.

11. The method of claim 10, further comprising a step of a customer computer providing one or more copies of its cached RMC to other system users.

12. The method of claim 1, wherein the first customer computer shares the RMC corresponding to the specified coherent digital content with a second or additional customer computers.

13. The method of claim 1, wherein the EMC associated with storage on the second or additional customer computers is erased during or immediately after play of the coherent digital content on the second or additional customer computers.

14. The method of claim 1, wherein the second or additional customer computers access the EMC and the reassembly algorithm corresponding to the specified coherent digital content, from the one or more streaming service providers.

* * * * *